United States Patent [19]

Smolik

[11] Patent Number: 4,483,453
[45] Date of Patent: Nov. 20, 1984

[54] ELECTRICAL RECEPTACLE BOX ASSEMBLY

[76] Inventor: Robert A. Smolik, 670 W. Seventh St., St. Paul, Minn. 55102

[21] Appl. No.: 530,236

[22] Filed: Sep. 8, 1983

[51] Int. Cl.³ ............................................ H02G 3/10
[52] U.S. Cl. ..................................... 220/3.5; 174/58; 174/63; 220/3.3; 220/3.9; 248/DIG. 6
[58] Field of Search ................. 220/3.5, 3.7, 3.9, 3.92; 174/58, 63; 248/DIG. 6, 205.1, 300, 27.1

[56] References Cited

U.S. PATENT DOCUMENTS

| | | |
|---|---|---|
| 2,016,284 | 10/1935 | Knight . |
| 2,265,957 | 12/1941 | Tinnerman . |
| 2,299,674 | 10/1942 | Austin, Jr. ........................ 220/3.5 X |
| 2,562,344 | 7/1951 | Tranas . |
| 2,567,309 | 9/1951 | Adair et al. . |
| 2,721,245 | 10/1955 | Arisman et al. . |
| 2,747,758 | 5/1956 | Appleton ............................. 220/3.92 |
| 2,759,621 | 8/1956 | Hamilton et al. . |
| 3,376,005 | 4/1968 | Swanquist . |
| 3,428,284 | 2/1969 | Trachtenberg et al. ......... 220/3.9 X |
| 3,474,994 | 10/1969 | Swanquist ................ 248/DIG. 6 X |
| 4,229,614 | 10/1980 | Smolik . |
| 4,403,708 | 9/1983 | Smolik ............................. 220/3.9 X |

FOREIGN PATENT DOCUMENTS 1243920 7/1967 Fed. Rep. of Germany .

OTHER PUBLICATIONS

1981 *Caddy Fasteners Catalog.*

Primary Examiner—Allan N. Shoap
Attorney, Agent, or Firm—Burd, Bartz & Gutenkauf

[57] ABSTRACT

An electrical receptacle box assembly mountable on a metal wall stud prepared with a plurality of mounting holes on a major side member thereof arranged in an ordered pattern. The assembly includes a box-like housing carrying a first set of bendable mounting tabs arranged in a pattern corresponding to the hole pattern on the metal wall stud. The tabs are insertable in the holes on the wall stud and can be bent in order to secure the housing. A second set of bendable mounting tabs are detachably connected to the housing and extend outward beyond the first set such that the user has a choice of mounting the housing to the wall stud using the first or second set of bendable mounting tabs. When the first set is used, the second set of tabs are first detached from the housing.

17 Claims, 10 Drawing Figures

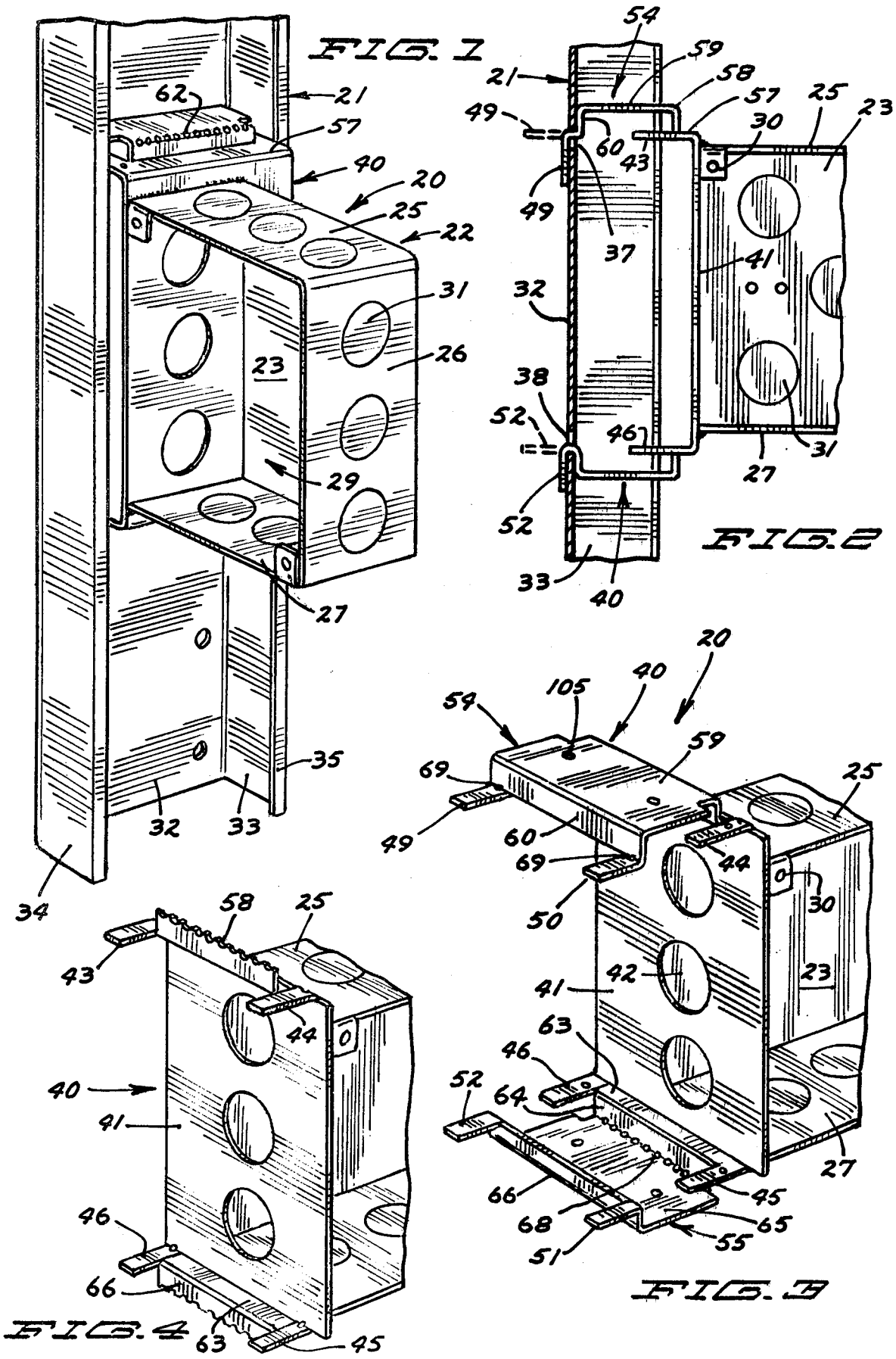

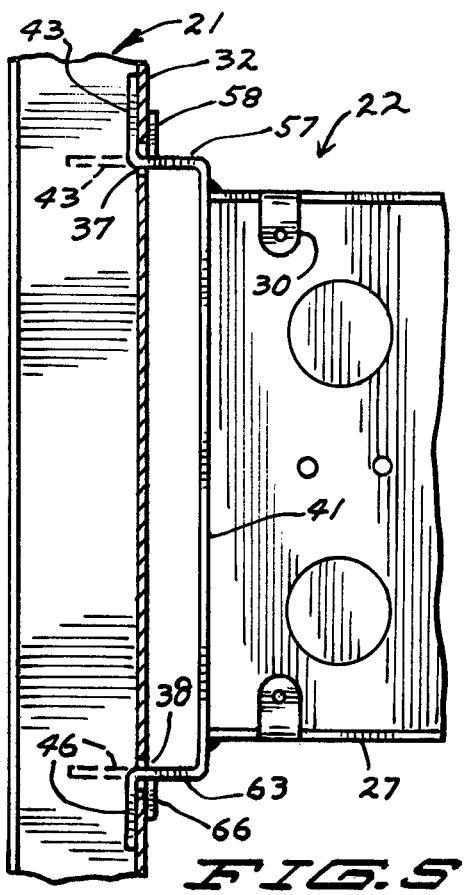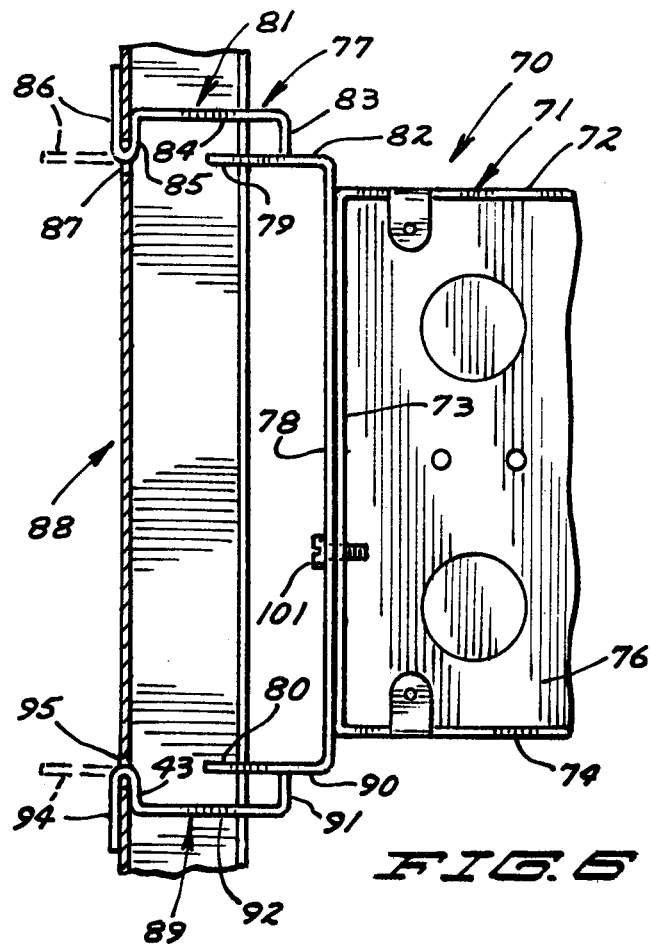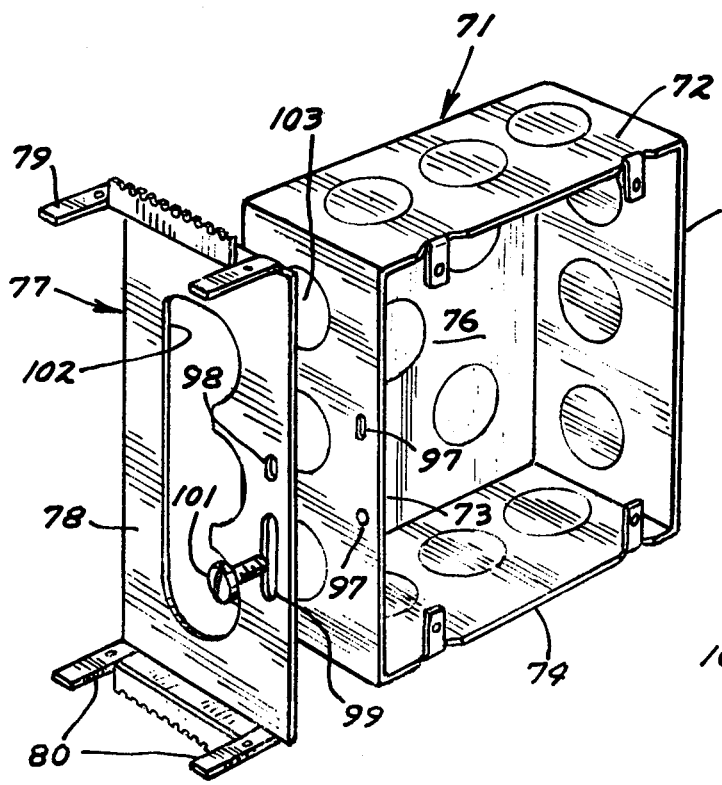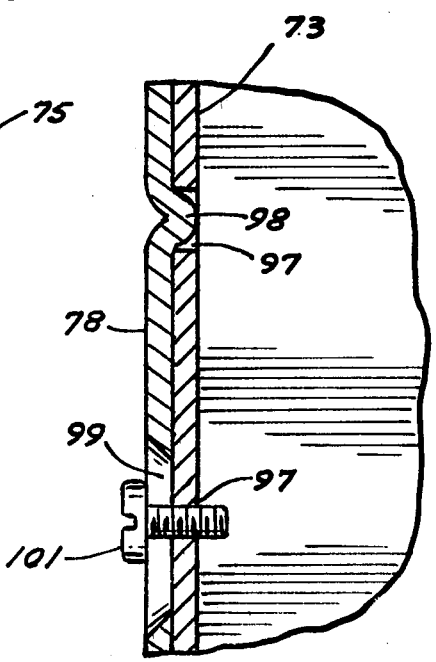

ELECTRICAL RECEPTACLE BOX ASSEMBLY

BACKGROUND OF THE INVENTION

The invention relates to the field of electrical receptacle boxes of the type mounted on a wall stud to hold an electrical receptacle such as an outlet or a switch or the like. In particular, the invention relates to such a receptacle box for mounting on a metal wall stud.

Metal wall studs find increasing use in commercial and residential construction because of superior durability and longevity characteristics. However, mounting electrical receptacle boxes to them presents special problems because they are not readily penetrable, as wood, by usual fasteners. For purposes of economy, especially when constructing a commercial building, it is desirable to mount the receptacle box to the wall stud as efficiently as is practical. In the prior art, clips are used which have a clamp portion which is forcefully fitted to the edge of the box. Another portion of the clip is fastened to the front of the metal stud, either by another spring clip or by a screw. In either case, this portion is covered by wallboard and presents a bulge that must be considered. Such installation is time-consuming and does not mount the receptacle box in as sturdy a fashion as desirable. Additionally, metal wall studs are U-shaped in cross section, having a major side member on one side and being open on the other. This can limit the choice of mounting locations using prior art mounting devices.

SUMMARY OF THE INVENTION

The invention comprises an electrical receptacle box assembly particularly adapted for mounting to a metal or other U-shaped wall stud. A metal wall stud intended for installation in a generally upright orientation in building construction is prepared with a plurality of mounting holes on the major side member thereof arranged in ordered patterns located according to preferred installation locations of receptacle boxes. The wall stud is U-shaped in cross-sectional area with the major side member directly accessible from one side, and accessible through the opening of the U configuration from the other. The electrical receptacle box assembly includes a housing having a back wall and side walls defining a front opening and an interior volume for housing an electrical receptacle to be accessible at the front opening. A bracket is fixed to the housing and has a flat, intermediate base which can either serve as one side wall for the housing or be attached to one of the housing side walls. The bracket has longitudinal ends carrying a first, or inboard, set of bendable mounting tabs, or ears, extended perpendicular to the base and outward from the housing. The tabs have ends arranged in a pattern according to the mounting hole pattern on the wall stud, preferably rectangular. Each longitudinal end of the base also carries a detachable support member. The detachable support members carry a second, or outboard, set of bendable mounting tabs, or ears, which are spaced outwardly with respect to the housing from the inboard set and also have ends defining a pattern according to the mounting hole pattern on the metal wall stud. Either the inboard or outboard set of mounting tabs are used alternatively to mount the housing to the wall stud. The outboard set, spaced further away from the housing, is used to mount the electrical receptacle box assembly to the open, or interior, side of the wall stud whereby the detachable support members span the space between the interior surface of the major side member of the wall stud and the adjacent side members. The inboard mounting tabs are used to mount the housing to the other side of the wall stud or the exposed surface of the major side member of the wall stud. When the inboard tabs are to be used, the detachable support members are removed from the bracket to provide access to the inboard tabs. In either case, the tabs are inserted in the mounting holes and then are bent about the mounting hole edges to secure the bracket to the wall stud. Extension plates can be provided in order to mount the housing at a location remote from the wall stud.

IN THE DRAWINGS

FIG. 1 is a perspective view of an electrical receptacle box assembly according to the invention mounted on the interior surface of the major side member of a metal wall stud;

FIG. 2 is a fragmented front elevational view partially in section of the electrical receptacle box assembly and wall stud of FIG. 1;

FIG. 3 is a fragmented perspective view of the electrical receptacle box of FIG. 1;

FIG. 4 is an additional fragmented perspective view of the electrical receptacle box of FIG. 3 with the detachable support members removed to access the inboard set of mounting tabs;

FIG. 5 is a fragmented front elevational view partially in section of the electrical receptacle box configuration of FIG. 4 mounted on the exterior surface of the major side member of a metal wall stud;

FIG. 6 is a fragmented front elevational view partially in section of an electrical receptacle box assembly according to a second form of the invention;

FIG. 7 is a perspective assembly view of the electrical receptacle box of FIG. 6 having the detachable support members of the mounting bracket removed;

FIG. 8 is an enlarged view of a portion of the electrical receptacle box of FIG. 6 showing means mounting the bracket to the box housing;

DESCRIPTION OF PREFERRED EMBODIMENTS

Figure 9:
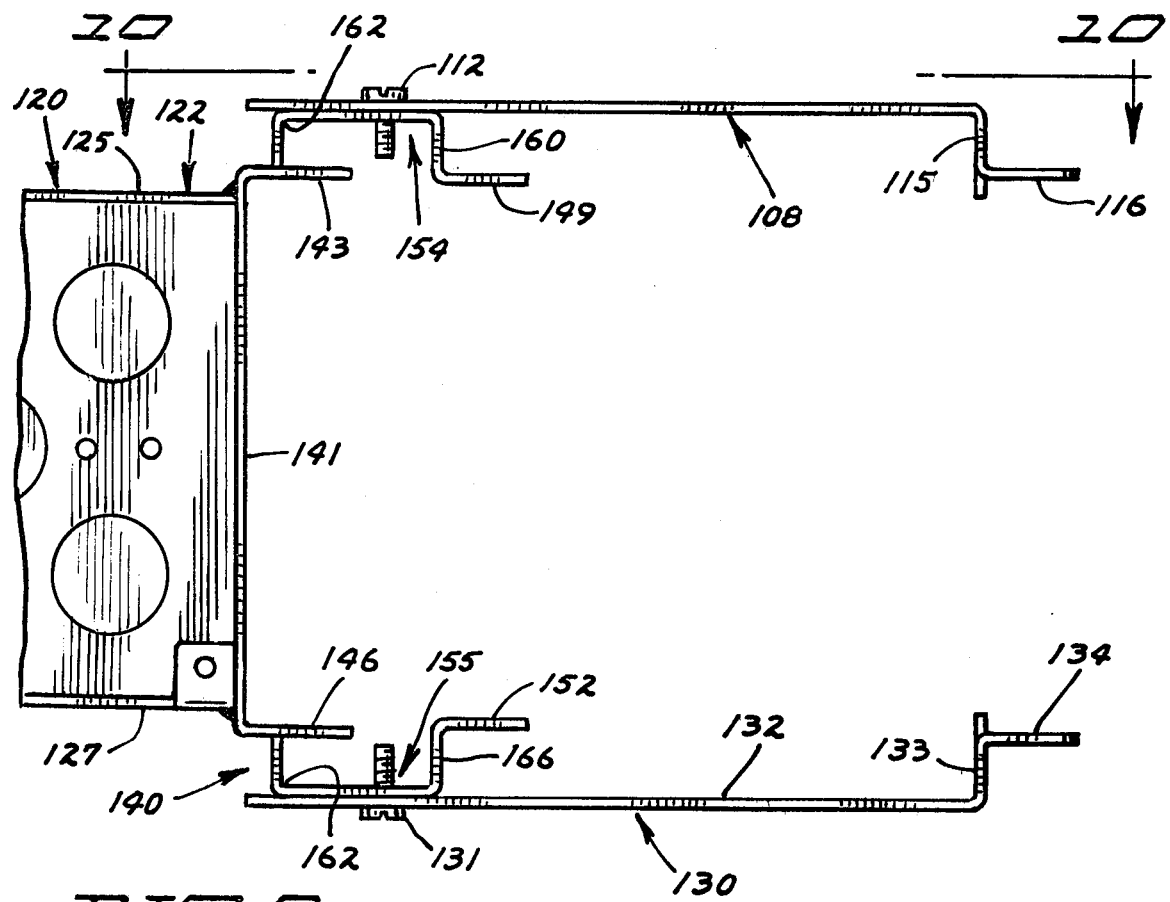
FIG. 9 is a side elevational view of an electrical receptacle box assembly equipped with extension members.

Referring to the drawings, there is shown in FIGS. 1-5 an electrical receptacle box assembly indicated generally at 20 according to a first form of the invention mounted on a metal wall stud 21 of the type used in building construction. Electrical receptacle box assembly 20 includes a housing 22 formed of a back wall 23 and perpendicularly orientated side walls 25, 26 and 27 defining a front opening 29 and an interior volume for accommodation of an electrical receptacle, such as a switch, outlet or the like, that can be mounted on bosses 30. The rear wall and side walls have a plurality of conventional knock-out members 31 for access to the interior of housing 22 from the sides and back for wiring, conduit or the like.

Wall stud 21 has a thin-walled major side member 32 and perpendicular end members 33, 34, as well as inwardly turned flanges 35 forming generally a U-shape, whereby major side member 32 has an interior surface as shown in FIG. 1 and an exterior surface opposite the interior surface.

Major side member 32 of metal wall stud 21 is provided with a plurality of uniform sets of mounting holes describing hole patterns located at spaced intervals on wall stud 21 as described in copending application Ser. No. 399,473 filed July 19, 1982 now U.S. Pat. No. 4,403,708 issued Sept. 13, 1983. The pattern described by the holes is rectangular, each pattern having a pair of upper holes 37 and a pair of lower holes 38 (see FIG. 2). Patterns of holes can be longitudinally arranged at specific elevations on stud 11 for the mounting of housing 22 at standardized elevations. Alternatively, mounting holes can be positioned continuously along the major side member 32 of wall stud 21 at regular intervals for practically universal mounting of the electrical receptacle box housing 22.

A bracket 40 is provided for mounting housing 22 to wall stud 21 and includes a flat, intermediate base 41 connected to upper and lower side walls 25, 27 by suitable means, as welding, to form a fourth side wall for housing 22 having a forward edge flush with the forward edges of the other side walls 25-27. The rearward edge of base 41 extends beyond back wall 23 of housing 22 to permit symmetrical mounting on wall stud 21. Bracket 40 carries first and second sets of linear bendable mounting tabs, or ears, that are useable in mutually exclusive fashion to mount housing 22 selectively on the interior or exterior surface of major side member 32 of wall stud 21. A first, or inboard, set of bendable mounting tabs 43-46 includes an upper pair of tabs 43, 44 and a lower pair of mounting tabs 45, 46 extended from upper and lower longitudinal ends of base 41 respectively, perpendicular to base 41 and away from housing 22. Tabs 43-46 are arranged in a pattern corresponding to that of the mounting holes 37, 38. Bracket 40 has a second, or outboard, set of bendable tabs 49-52. The upper pair of tabs 49, 50 are carried by an upper separable, or detachable, support member 54 and the lower pair of tabs 51, 52 are carried by a lower detachable support member 55. Upper support member 54 includes a shoulder 57 extended from the upper edge of base 41 between the upper pair of inboard tabs 43, 44 and outwardly from housing 22. A neck 58 extends upwardly a short distance in perpendicular relationship from the shoulder 57. An outwardly extended planar portion 59 extends outward from the upper edge of the neck 58 to a downwardly turned lip 60. The upper outboard pair of tabs 49, 50 extend outwardly in perpendicular relationship from the lower edge of lip 60 and are aligned with the upper inboard pair of tabs 43, 44. The purpose of neck 58, outwardly extended planar portion 59 and downwardly extended lip 60 is to space the outboard mounting tabs 49, 50 ahead of, but in alignment with, the inboard tabs 43, 44. As shown in FIG. 1, at the intersection of the neck 58 and outwardly extended portion 59 is a linear line of holes forming a line of perforation 62 or a break-away hinge. Support member 54 can be broken away from the remainder of bracket 40 at this point.

Lower support member 55 is identical in construction having a shoulder 63 extended away from the lower edge of base 41, a neck 64 extended downwardly a short distance in perpendicular relationship from the shoulder 63 to a planar outwardly extended portion 65 which extends outwardly from housing 22 in perpendicular relationship to the neck 64. A lip 66 extends perpendicularly upward from the outer extreme of the planar portion 65. The lower pair of outboard mounting tabs 51, 52 extend outward from the upper edge of lip 66. The lower outboard pair of tabs 51, 52 are in alignment with, but spaced outward from, the inboard lower pair of tabs 45, 46. A line of perforation 68 occurs at the intersection of the neck 64 and planar extended portion 65. The planar extended portion 65, along with lip 66 and outboard mounting tabs 51, 52, can be broken away from the remainder of bracket 40 at this point.

As shown in FIG. 3 with respect to the bendable mounting tabs 49, 50, a small opening or hole 69 occurs at the intended point of bending of the mounting tab. The opening 69 facilitates bending of the tab about the edge of a mounting hole.

FIGS. 1 and 2 illustrate use of the electrical receptacle box 20 shown in the configuration of FIG. 3. The assembly is installed on the interior surface of the major side member 32 of wall stud 21. Outboard mounting tabs 49-52 are inserted through mounting openings 37, 38. The tabs are then bent about the hole edges to secure bracket 40 in place with respect to the wall stud. The tabs are shown in straight form in phantom in FIG. 2 and in the bent and installed configuration in full lines. Upper and lower support members 54, 55 serve to space the housing 22 away from the surface of the major side member 32 of wall stud 21 so that the opening 29 will be in clearing relationship with respect to the end members 33, 34 of wall stud 21. In this configuration, the tabs are inserted into the mounting holes a distance such that the upper and lower lips 60, 66 of the respective support members abut against the interior surface of major side member 32. The tabs are bent over either manually or with the use of a tool, such as a hammer. When so installed, housing 22 is firmly secured with respect to the wall stud 21 preparatory to mounting an electrical receptacle. The mounting tabs are positioned on bracket 40 such that opening 29 is generally flush with but slightly receded with respect to the outer surface of end member 34 of wall stud 21. This permits flush installation of a plaster ring during completion of the installation.

In most instances, installation of the electrical receptacle box in the configuration shown in FIGS. 1-3 will be satisfactory. However, occasionally it may be desired to mount the box housing 22 closer to the mounting surface, as is shown in FIG. 5, where the electrical receptacle box assembly is mounted to the exterior surface of the major side member 32 of wall stud 21. As shown in FIG. 4, the electrical receptacle box assembly 20 is prepared for this configuration by breaking away the upper and lower detachable support members 54, 55 at the lines of perforation 62, 68 on the necks and respective outwardly extended planar portions. This is done manually or with a tool such as a pliers. Only the inboard set of mounting tabs 43-46 remain together with the shoulders 57, 63 and the vertical necks 58, 64. In this configuration, the tabs of the inboard set are inserted in the mounting holes 37, 38 and bent over the edges of the holes. In FIG. 5, the straight tabs are shown in phantom and the tabs, as bent and installed with respect to major side member 32, are shown in full lines. The tabs are inserted in the mounting holes to a point where the surface of major side member 32 is intercepted by the upper and lower lips 58, 64. This serves to space the base 41 slightly away from the surface of the major side member 32. As shown in FIGS. 3 and 5, the mounting tabs can either be bent upwardly or downwardly at the option of the installer. Means other than perforations could be used to weaken the support members at the intersections of the neck and planar portions.

In FIGS. 6-8, there is shown a modification of the invention wherein a standard electrical receptacle box is fastened to a bracket according to the invention to enable the assembly to be mounted on a metal wall stud of the type provided with uniform hole patterns as earlier described. An electrical receptacle box assembly 70 includes a housing 71 having perpendicularly orientated walls 72, 73, 74, 75 and a back wall 76 defining a front opening and an interior volume to accommodate an electrical receptacle. A bracket 77 is fastened to the housing 71. Bracket 77 has an elongate, flat, intermediate base 78 which is fastened to one of the side walls 73 of the housing 71. Inboard bendable tabs 79, 80 are provided extended outwardly from either longitudinal end of the base 78. Base 78 is of a sufficient length to accommodate electrical receptacle boxes of various sizes. Bracket 77 has an upper detachable support member 81 extended from the upper longitudinal edge of base 78 and including a horizontal shoulder 82 extended forward from base 78 to a vertical neck 83 which extends perpendicularly from shoulder 82 a short distance upward to a flat planar outwardly extended portion 84, to a downwardly extended vertical lip 85 parallel to neck 83. Bendable tabs 86 extend outwardly from the lower edge of lip 85 for insertion through an upper pair of holes 87 disposed in a metal wall stud 88 on the interior surface of the major side member thereof. The tabs 86, once extended through the holes 87, are bent around the edge of the hole.

A lower detachable support member 89 includes a shoulder 90 extended outwardly from the lower edge of base 78 to a neck 91 extended vertically downward for a short distance to a horizontal outwardly extended planar portion 92 terminating in an upwardly turned lip 93. Lower outboard tabs 94 extend from the upward edge of lip 93 for insertion through openings 95 comprised as the lower pair of openings of a generally rectangular pattern disposed on the surface of the major side member of wall stud 88. Tabs 94 are also bent around the hole edges to secure bracket 77 and thus housing 71 to the wall stud 88 preparatory to mounting an electrical receptacle.

The intersections between the neck 83 and outwardly extended planar portion 84 of upper detachable support member 81, and the neck 91 and outwardly extended planar portion 92 of lower detachable support member 89 are defined by perforations as earlier described. As shown in FIG. 7, the upper and lower detachable support members are removable by separating them at the perforation from the remainder of the bracket 77, thus exposing the inboard bendable tab members for use in mounting the electrical receptacle box closer to the mounting surface. Also shown in FIGS. 7 and 8 is the means by which the base 78 is fastened to the housing 71. Standard electrical receptacle box housings are equipped with mounting holes on one or more side walls, as the holes 97 in the side wall 73 of box 71, although the spacing between the holes will vary from one model of box to another. Base 78 of bracket 77 is provided with a dimple or projection 98 and an elongate slot 99 which are relatively spaced and positioned such that when the projection 98 engages one of the holes 97, as shown in FIG. 8, the other hole 97 will be encompassed by a portion of the slot 99. The walls of slot 99 are tapered and can threadably receive the shank of a self-threading screw 101, which also threads into the hole 97. Projection 98 and screw 101 together securely hold base 78 to the wall 73 of housing 71. Base 78 has an enlarged central opening 102 which, when the base is fastened to wall 93, will encompass the openings which are provided by knock-out members 103 in the side wall 73 of housing 71 for access to the interior of the housing by conduit or the like.

Figure 10:
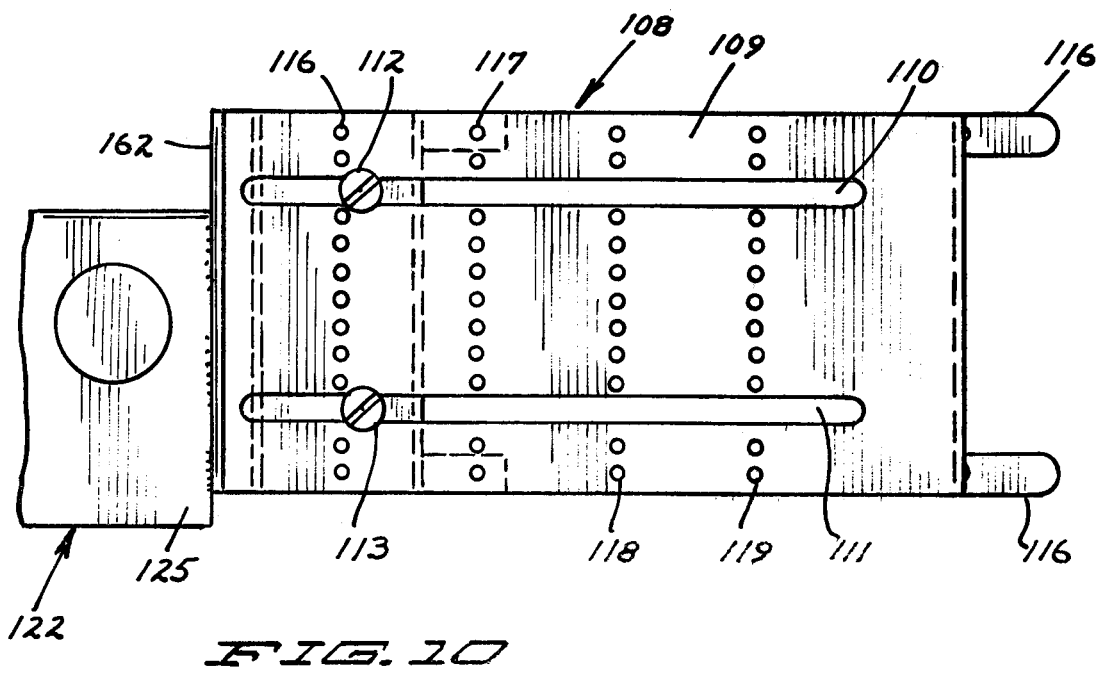
FIG. 10 is a top plan view of the electrical receptacle box assembly of FIG. 9 taken along the line 10—10 thereof.

According to the embodiment shown in FIGS. 9 and 10, means are provided for positioning an electrical receptacle box at selected intermediate locations between adjacent wall studs through the use of extension members. An electrical receptacle box assembly 120 is identical in construction to that described with respect to FIGS. 1-3, having a housing 122 with side walls 125, 127 and a bracket 140. The bracket 140 has an intermediate base 141 attached to side walls 125, 127 to form a fourth side wall. Bracket 141 carries inboard bendable mounting tabs 143, 146 and outboard bendable mounting tabs 149, 152. The outboard tabs are carried on upper and lower support members 154, 155 that are detachable at lines of perforation 162 as earlier described. An extension member 108 is fastened to the upper separable support member 154. Extension member 108 includes an elongate, flat extension plate 109 having a pair of parallel, spaced apart, elongate slots 110, 111. Screws 112, 113 have shanks which pass through the slots 110, 111 and are threaded into holes provided in the upper support member, such as the holes 105 shown in FIG. 3. Screws 112, 113 can be loosened, whereby the location of extension of plate 109 is adjusted by movement of the screws with respect to the slots 110, 111. The outward end of plate 108 terminates in a downwardly turned lip 115. Bendable mounting tabs 116 extend outward from the lower edge of the lip 115 and are positioned so to be in line with the other mounting tabs of bracket 140. Plate 109 has a series of transverse lines of perforation 116–119. Portions of plate 109 can be broken away at the lines of perforation. When plate 109 is adjusted such that the screws are at an intermediate point along the slots 110, 111, an excess of plate 109 would normally extend rearwardly or to the left as shown in FIGS. 9 and 10. Much of the excess is removed simply by breaking away a portion of plate 109 at an appropriate line of perforation.

The lower extension member 130 is identical and is fastened to the lower detachable support member 155 by screws 131 and includes an outwardly extended elongate extension plate 132 terminating in an upwardly turned lip 133 which carries a pair of bendable mounting tabs 134. The mounting tabs 134 are in line with the other lower mounting tabs of bracket 140, and together with the bendable mounting tabs 116 of extension member 108, form a hole pattern corresponding to the hole pattern as previously described with respect to FIGS. 1-3. The tabs are mountable in the hole pattern as previously described and are bent over the hole edges to securely hold electrical receptacle box assembly 120 in place. The location of the box is readily adjustable through the use of the slots and mounting screws, such that the housing 122 can be located at virtually any location desired between wall studs.

While there has been shown and described certain embodiments of an electrical receptacle box according to the invention, it will be apparent that certain deviations and changes can be had from the embodiments shown without departing from the scope and spirit of the invention. The various electrical receptacle box assemblies have been shown mounted in relationship to upright wall studs; however, it is apparent they could also be mounted to a horizontally disposed wall stud, such as one spanning a ceiling area for holding of a ceiling fixture. The wall stud need not be metal but could be of other sturdy building material and having a U-shaped cross section.

The embodiments of the invention in which an exclusive property or privilege is claimed are defined as follows:

1. An electrical receptacle box assembly, comprising:
   a box-like housing for accommodation of an electrical receptacle;
   a wall stud of the type having a major side member with a relatively thin wall thickness, said major side member being provided with a plurality of mounting holes describing a hole pattern;
   a set of plurality of linear bendable mounting tabs fixed at one end to the housing and extended outwardly from the housing with other ends describing a pattern corresponding to the hole pattern on the major side member of the wall stud;
   said tabs being insertable into the holes of the hole pattern and bendable about the mounting hole edges to secure the housing with respect to the wall stud.

2. The electrical receptacle box assembly of claim 1 wherein: said mounting holes on the major side member of the wall stud from a rectangular hole pattern.

3. The electrical receptacle box assembly of claim 1 wherein:
   said tabs comprise an inboard set of mounting tabs, and including a set of a plurality of outboard bendable mounting tabs spaced outwardly from the inboard tabs with respect to the housing and having outer ends describing a pattern corresponding to the hole pattern of the major side member of the wall stud;
   means detachably connecting the outboard set of tabs to the housing;
   said outboard set of tabs being insertable in the mounting holes and bendable about the hole edges to secure the housing with respect to the wall stud, and said outboard set of tabs being detachable from the housing to permit insertion of the inboard set of tabs in the mounting holes of the wall stud.

4. The electrical receptacle box assembly of claim 1 including: a bracket fixed to the housing having first and second longitudinal ends and an elongate intermediate base between the ends, said set of tabs including first and second tabs extended outwardly from a first longitudinal end of the bracket, and third and fourth tabs extended outwardly from the second end of the bracket, said tabs describing a rectangular pattern.

5. The electrical receptacle box assembly of claim 4 wherein: said housing has perpendicularly orientated side walls, said base of the bracket comprising one side wall of the housing.

6. The electrical receptacle box assembly of claim 4 wherein: said housing has perpendicularly orientated side walls, said base of the bracket being connected to one of said side walls.

7. The electrical receptacle box assembly of claim 4 wherein:
   said tabs comprise an inboard set of mounting tabs, and including a set of a plurality of outboard bendable mounting tabs spaced outwardly from the inboard tabs with respect to the housing and having outer ends describing a pattern corresponding to the hole pattern of the major side member of the wall studs;
   means detachably connecting the outboard set of tabs to the bracket;
   said outboard set of tabs being insertable into the mounting holes and bendable about the mounting hole edges to secure the housing with respect to the wall stud, and said outboard set of mounting tabs being detachable from the bracket to permit insertion of the inboard set of mounting tabs into the mounting holes.

8. An electrical receptacle box assembly for mounting on a wall stud of the type with a generally U-shaped cross section and a major side member having an interior surface and an exterior surface, and provided with a set of mounting holes arranged in a generally rectangular pattern, comprising:
   a box-like housing for accommodation of an electrical receptacle;
   a bracket having first and second longitudinal ends and an elongate, generally flat, intermediate base between the ends, said base being attached to the housing;
   an inboard set of bendable mounting tabs comprised as first and second tabs located on the first longitudinal end of the bracket and extended outwardly of the housing, and second and third bendable mounting tabs located on the second longitudinal end of the bracket extended outwardly of the housing, said first, second, third and fourth mounting tabs describing a pattern corresponding to the mounting hole pattern on the wall stud;
   a first detachable support member extended from the first longitudinal end of the bracket outwardly of the housing and first and second mounting tabs, and a second detachable support member extending from the second longitudinal end of the bracket outwardly of the housing and outwardly of the third and fourth mounting tabs;
   an outboard set of bendable mounting tabs comprised as fifth and sixth bendable mounting tabs extended from the outward end of the first detachable support member in alignment with the first and second bendable mounting tabs, and seventh and eighth bendable mounting tabs extended from the outward end of the second detachable support member in alignment with the third and fourth bendable mounting tabs, said fifth, sixth, seventh and eighth bendable mounting tabs forming a pattern corresponding to the hole pattern on the major side member of the wall stud;
   means detachably connecting the first and second detachable support members on the bracket whereby the outboard set of mounting tabs are insertable in the mounting holes and bendable about the hole edges to secure the housing with respect to the wall stud, and are detachable from the bracket to permit the inboard set of mounting tabs to be inserted in the mounting holes and bent about the hole edges to secure the housing with respect to the wall stud.

9. The electrical receptacle box assembly of claim 8 wherein: means detachably connecting the first and second support members to the bracket includes lines of perforation.

10. The electrical receptacle box assembly of claim 8 wherein: said housing has perpendicularly orientated side walls, said base of the bracket comprising one side wall of the housing.

11. The electrical receptacle box assembly of claim 8 wherein: said housing has perpendicularly orientated side walls, said base of the bracket being connected to one of said side walls.

12. The electrical receptacle box assembly of claim 8 wherein:
said first support member includes a shoulder outwardly extended from the first longitudinal end of the base, a neck extended a short distance perpendicularly away from the outward end of the shoulder, a planar portion extended outward from the end of the neck parallel to the shoulder, a lip extended from the outward end of the planar portion in the same direction as the neck, said fifth and sixth bendable mounting tabs extended outward from the lip;
said second support member including a shoulder outwardly extended from the second longitudinal end of the base, a neck extended a short distance perpendicularly away from the outward end of the shoulder, a planar portion extended outward from the end of the neck parallel to the shoulder, a lip extended from the outward end of the planar portion in the same direction as the neck, said seventh and eighth bendable mounting tabs extending outward from the lip.

13. The electrical receptacle box assembly of claim 12 wherein: said means detachably connecting the first and second detachable support members to the bracket comprises lines of perforation on the first and second support members at the intersection of the necks and planar portions.

14. The electrical receptacle box of claim 12 wherein: said housing has perpendicularly orientated side walls, said base of the bracket comprising one side wall of the housing.

15. The electrical receptacle box of claim 12 wherein: said housing has perpendicularly orientated side walls, said base of the bracket being connected to one of said side walls.

16. The electrical receptacle box assembly of claim 12 including: a first extension member mountable on the planar portion of the first detachable support member and having an outer end carrying ninth and tenth bendable mounting tabs, and a second extension member mountable on the planar portion of the second detachable support member and having an outer end carrying eleventh and twelfth bendable mounting tabs, said ninth, tenth, eleventh and twelfth bendable mounting tabs being arrangeable in a pattern corresponding to the mounting hole pattern on the wall stud.

17. An apparatus for connecting an electrical receptacle box housing to a wall stud of the type having a U-shaped cross section and a major side member prepared with a set of mounting holes arranged in a mounting hole pattern, comprising:
a bracket having first and second longitudinal ends and an elongate, generally flat, intermediate base between the ends, said base carrying means for fastening an electrical receptacle box housing;
a first inboard set of bendable mounting tabs located on the first and second longitudinal ends of the bracket and extended outwardly therefrom, said first set of bendable mounting tabs describing a pattern corresponding to the hole pattern on the wall stud;
a first detachable support member extended from the first longitudinal end of the bracket outwardly thereof, and a second detachable support member extending from the second longitudinal end of the bracket outwardly thereof, said first and second detachable support members carrying a second set of mounting tabs, said second set of mounting tabs describing a pattern corresponding to the mounting hole pattern on the wall stud;
means detachably connecting the first and second detachable support members to the bracket whereby the tabs of the outboard set of mounting tabs are insertable in the mounting holes and bendable about the hole edges to secure the electrical receptacle box housing attached to the base with respect to the wall stud, and are detachable from the bracket to permit the tabs of the first set of mounting tabs to be inserted in the mounting holes and bent about the hole edges to secure an electrical receptacle box housing fastened to the base with respect to the wall stud.

* * * * *